Figures 1, 2:
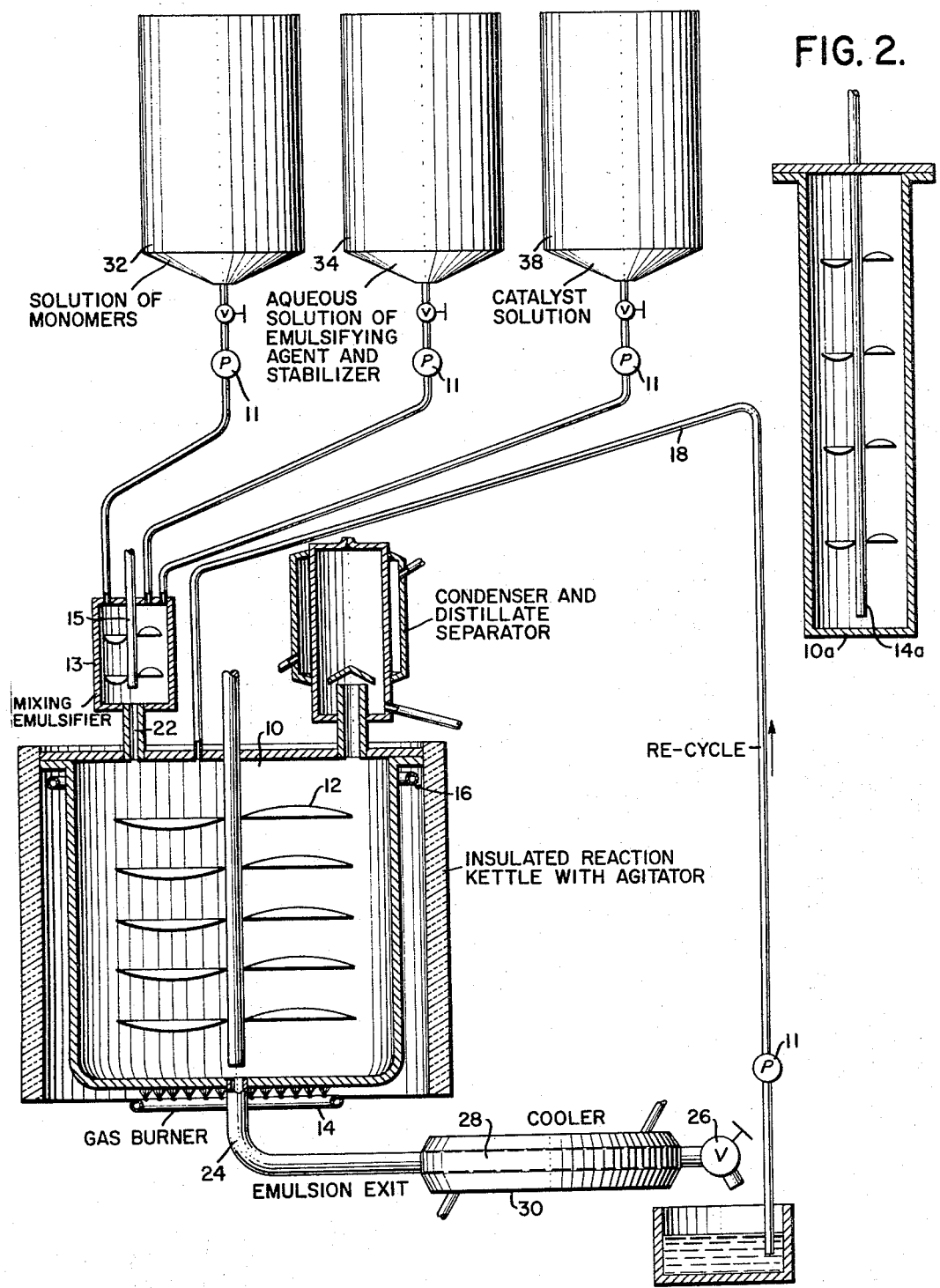

Jan. 3, 1967 F. E. JIRIK ETAL 3,296,168
CONTINUOUS FLOW POLYMERIZATION OF VINYL ACETATE IN EMULSION
Filed July 11, 1962

INVENTORS
FRANK E. JIRIK
FERNANDO CASTAÑEDA

United States Patent Office 3,296,168
Patented Jan. 3, 1967

3,296,168
CONTINUOUS FLOW POLYMERIZATION OF
VINYL ACETATE IN EMULSION
Frank E. Jirik, Moravia, and Fernando Castañeda, San Ramon de Tres Rios, Costa Rica, assignors to Kativo, S.A., San Jose, Costa Rica, a corporation of Costa Rica
Filed July 11, 1962, Ser. No. 208,983
6 Claims. (Cl. 260—29.6)

This invention relates to methods and apparatus for producing emulsions of polymers.

Aqueous emulsions of polymers and copolymers have come into extensive use for manufacture of a variety of products such as paint, adhesives, etc. For example, in paint these emulsions carry the polymer in such finely dispersed form that it leaves a strong uniform film upon evaporaiton of the water. These emulsions alone, or with desired pigments are notable for their property of distributing themselves in a film in a very uniform manner and protecting the surface to which they are applied. These emulsions thus make magnificant paints which in commerce are known as "latex paints." This product, due to its fine quality, has little by little been taking the place of the older paints based on linseed oil.

Before initiating the detailed description of the process and apparatus that we have developed for the continuous manufacture of emulsions of polymers and copolymers, it is convenient that we clarify the precise technical significance of certain terms:

An "emulsion" is a dispersion of a substance, liquid or solid, in a liquid in which it is no more than slightly soluble. For example, in the case of emulsions of oil and water the oil is dispersed in the form of very fine droplets in a continuum of water. In order to realize this dispersion, it is necessary to apply energy to break up the oil (or other "disperse" phase) e.g., violent agitation and/or shearing. The dispersion may be facilitated by utilizing emulsifying agents. It is sometimes convenient also to add substances which are called "stabilizers" to the emulsions. A "polymer" is a chemical compound, of very large molecular size, which is obtained through addition or condensation reactions with themselves, of smaller molecules called "monomers." An example of such monomeric substances capable of joining with themselves directly and alone, or indirectly through another monomer to form "co-polymers," is vinyl acetate, which in turn forms a polymer called "polyvinyl acetate." If one begins with a mixture of monomers, one can obtain a copolymer. Copolymers are a special class included in the general term "polymer." If only one kind of monomer enters into the formation, they are "homopolymers."

When the reaction of polymerization is conducted in aqueous emulsion, the monomers can be dispersed in this emulsion and the reaction can occur in such manner that the polymer formed is also dispersed or emulsified in water.

In the usual process for the manufacture of aqueous emulsions of polymers, the reaction is carried out in a discontinuous or batch manner. This requires very large batches, and therefore large apparatus, in order to obtain a commercial volume, and furthermore brings with it a series of problems and dangers. For example: (1) The difficulty of obtaining uniformity between one lot and another. (2) The larger the receptacle, the greater the problem of controlling the temperature at the most convenient point. (3) The danger of fire or explosion due to the unstable nature of the raw materials utilized and the inherent exothermic nature of the reaction. (4) The possibility of coagulation due to a high ratio of monomer to polymer.

In the process of this invention the monomer is first dispersed in the liquid vehicle for the emulsion product—ordinarily water. A liquid monomer, e.g., such as vinyl acetate is flowed into the aqueous vehicle either a batch or in continuous proportioned flow and emulsified by any of the known emulsifiers. This emulsion and a suitable polymerization catalyst are injected into a vessel which is kept filled with polymer emulsion, so that foaming is suppressed. As fresh emulsion is pushed into the vessel, polymer emulsion is ejected e.g., through a pressure valve at the outlet. The feed rate of monomers is kept always below that which would raise the amount of monomer above that of the polymer. In actual practice, the ratio of polymer to monomer is maintained well above 1:1 and the reaction rate is slightly above the rate at which fresh monomer is applied. The pressure in this reaction vessel is advantageously above atmospheric but is not critical.

If the product is allowed to drop to a polymer to a monomer ratio as low as 1:1, the monomer will plasticize the polymer to a sticky mass, which is difficult to handle. A much higher ratio is advantageous. For best results, it is advantageous to keep the ratio of polymer/monomer in the emulsion at about 97:3 and feed in vinyl acetate monomer emulsion at substantially the same rate that the monomer is taken up in the polymer.

The continuous process, which is one characteristic and objective of this invention, is brought about with the apparatus shown in FIGURE 1. The reaction vessel, or kettle, is identified by the numeral 10. The symbol 11 indicates pumps for the respective reagent liquids and vehicles. A tubular ring 16 is provided with small holes directed toward the top of the kettle 10 through which one can spray cooling water on the side of the kettle. It is evident that the system of cooling as well as heating by gas flame, could be performed instead by a coil in the interior of the tank without in any way changing the fundamental nature of this invention. Likewise, the tank for carrying out the polymerization can be larger or smaller or in tubular form as compared with FIGURE 1, e.g., as shown in FIG. 1.

For a plant of a capacity of 100 gallons per hour, the receptable 10 where the polymerization is carried out, may have a volume of e.g., 40 gallons or less. This may be provided with means to maintain gentle agitation.

The mixing emulsifier 13 is a smaller receptacle, for example half gallon capacity, equipped with an agitator 15. In the mixing emulsifier, by means of violent agitation, the monomer is emulsified with water and ordinarily with an emulsifying agent and a stabilizer and any other necessary or desired ingredients. The drawing shows a conventional agitator; but it will be understood that other types of emulsifiers could be substituted, for example a pump with a small opening or a supersonic vibrator, without departing from the invention claimed herein.

The procedure of operation is as follows: One commences with the reaction kettle partially or totally filled with an emulsion of polymers, prepared in advance. Later, after heating to the most convenient polymerizing temperature, one commences to add the emulsion of monomers made in the mixer emulsifier, as indicated in FIG. 1. This monomer emulsion begins to react in the reaction kettle, with the gentle agitation being such that, when the emulsion arrives at the bottom of the receptacle 10, the monomer is almost totally reacted to the polymer. The heating of the bottom by the burner 14 insures that the reaction is as nearly completed as possible; or, if desired, the emulsion may be passed through a heater coil. If the temperature in the kettle becomes excessive, a cold flush from pipe 16 can be applied to the exterior of the kettle.

In the practical operation of this process, one may recycle part of the emulsion to attain a lower ratio of monomer to polymer. To effect such recirculation, an auxiliary pump 17 and recycle pipe 18 are provided, as indicated in FIGURE 1.

If the temperature and pressure in the kettle are such that the monomer boils, then a condenser and separator are used to condense and recover the part of the monomer which is vaporized; and it is then returned to the monomer solution at 32 or 13 and is utilized again.

More advantageously, I maintain a greater pressure in the kettle sufficient to suppress vaporization. Thus one works with the receptacle completely filled with emulsion, and the condenser may be omitted. In this manner, the danger of the formation of foam is eliminated, and the operation is more uniformly satisfactory.

The equipment described has been tested, in commercial scale manufacture, e.g., for co-polymerizing an emulsion of vinyl acetate and 2-ethyl-hexyl-acrylate. In like manner, the process is applicable to the polymerization of emulsions of butyl acrylate, ethyl acrylate, di-butyl-maleate, di-2-ethyl-hexyl maleate, vinyl stearate, vinyl chloride, methyl methacrylate, and any other polymerizing monomers.

The principal advantages in the process of this invention are the following:

(1) The process occupies less space.

(2) It eliminates the large investment in a large size reaction kettle used in the batch process.

(3) Due to the small size of the reactor, better control of temperature is obtained.

(4) Better uniformity and control on the quality of the product.

(5) The fact that the emulsification of monomers is done separately from the polymerization is an advantage because the first requires a high agitation while the second is brought about better with a slow agitation. A high-speed stirrer may coagulate the emulsion.

(6) There is less risk of accidents in this new process due to better control and small total quantities of ingredients in process at any moment.

(7) Less danger of actual coagulation because of low ratio of monomer to polymer at all times.

One specific example of the application of the invention to practical manufacture of an aqueous emulsion of a co-polymer adapted for manufacture of protective coatings and the like, is as follows:

(1) A stainless steel kettle 10 is equipped with an agitator 12 of the same material driven by a motor through a speed reducer to turn at 700 revolution per minute.

The kettle is also heated, e.g., by a gas flame, from burner 14 and cooled, e.g., by a falling film of water on the outer surface of the kettle from pipe 16.

In this example, the temperature of the reaction mass 19 inside is held by this means at 80° C. To this purpose, a thermostat (not shown) may be provided in the reactor to control the flow of cooling water.

The reactor 10 is a stainless steel cylinder, 22 inches high and 16 inches in diameter with a capacity of about 20 gallons. There is an inlet 22 for solutions and an exit 24 controlled by a pressure operated valve 26. There is also a registering thermometer and a manometer (neither shown in drawings). All valves are of stainless steel. The exit tube is connected with a cooler consisting of a stainless steel tube 28 submerged in a water bath 30 held, in this example, at 90° C.

(2) An auxiliary tank 32 serves for the storage of the monomer solution (in this case vinyl acetate and 2-ethyl hexyl acrylate) with agitator (Solution I).

(3) An auxiliary tank 34 of 125 gallon capacity serves for the preparation and storage of a water solution (Solution II) of the emulsifying agents and hydrogen peroxide. This tank is also provided with an agitator 36.

(4) Tank 38 of 125 gallon capacity for storage of a solution (Solution III) of potassium per-sulphate $K_2S_2O_8$, this tank is provided with an agitator 40.

(5) Three pumps with adjustable feed velocities are connected to tanks of (2), (3) and (4) respectively for pumping Solutions I, II and III.

(6) Three rotameters are provided to measure the flow of Solutions I, II and III, respectively.

*Procedure*

The reactor is filled completely with previously prepared finished emulsion of co-polymer with the usual 55% solid co-polymer content.

The agitation is started and the kettle is heated, for example, to 80° C. To this are then added Solutions I, II and III in such a way that they are in proportion of 1.00:0.389:0.389. The total flow is, in this instance, 80 gallons per minute.

The pressure of the kettle is held at about 15 p.s.i. Once the reaction 13 starts the flow of fuel to burner 14 is cut off, as the reaction is exothermic.

The thermostat on the kettle controls the reaction temperatures, e.g., by controlling the circuit of a solenoid valve which in turn regulates the flow of cooling water which falls in a film over the surface of the kettle.

After leaving the kettle, the emulsion passes through a tube, in this instance, submerged in water at 90° C. The outlet valve 26 from the kettle is regulated to open at a suitable pressure, e.g., 15 lb. per sq. in. This, of course, controls the pressure in the kettle at e.g., 15 p.s.i.

In this manner the free unpolymerized monomer is held to less than 0.5% of the emulsion product.

The emulsion is collected in drums for shipment or storage.

On finishing the run, the kettle remains full of emulsion which is, in this instance, cooled to 20–25° C. This emulsion is later used when the continuous process is again initiated.

Lining the reaction equipment with polytetrafluoro ethylene (Teflon) or silicone rubber or other release agent helps by preventing the formation of polymerization nuclei at the surface of the equipment.

The product of the present invention has a higher molecular weight than polymer emulsions made from the same monomers by the ordinary commercial methods in use heretofore. This is believed to be due to the fact that in the present process a lower concentration of catalyst is used.

The catalyst used may be chosen from known

The catalyst used may be chosen from known polymerization catalysts including $H_2O_2$, $K_2S_2O_8(NH_4)_2S_2O_8$, $Na_2O_2$, benzoyl peroxide, methyl ethyl ketone peroxide or mitures of them. The amount used should be calculated on the monomer content, e.g., with vinyl acetate, $H_2O_2$ 0.1–2.0%, $K_2S_2O_8$ 0.1–2.0%, or benzoyl peroxide up to 0.5%; but in general is less than in a batch operation because one does not have to initiate the reaction in an incoming batch, it mingles with the already reacting material and is catalyzed by it.

This invention is generally applicable in like manner for formation in emulsion of homopolymers and copolymers of plastic forming monomers. One may select from among the usual emulsion stabilizers, e.g., hydroxy ethyl cellulose, especially as sold by Union Carbide Corporation under the name "Cellosize," polyvinyl alcohol, methyl cellulose, alginates, polyacrylates, the emulsion stabilizers sold by American Cyanamid Co. under the name "Aerosols" especially the alkyl sodium esters of sulfonated di-carboxylic acids, such as dioctyl sodium sulfo succinate, the alkyl aryl ethers of polyethylene glycol sold by Union Carbide Corporation under the name "Tergitol," decyl alcohol, iso decyl alcohol and in general the surface active agents of the types used for emulsion stabilization.

The concentration of the polymer in the emulsion is advantageously in the range 10–70%, especially 55–60% for ordinary commercial operation.

Residence time in the kettle is, of course, dependent upon the activity and amount of catalyst used. In practice, times of one hour at twenty gallons per hour, one-half hour at forty gallons per hour or ten minutes at 120 gallons per hour have been used.

What is claimed is:
1. A continuous method of emulsion polymerization and co-polymerization, which comprises polymerization of monomers selected from the group consisting of butyl acrylate, ethyl acrylate, di-butyl-maleate, di-2-ethyl-hexyl maleate, vinyl stearate, vinyl chloride, methyl methacrylate, vinyl acetate, and 2-ethyl-hexyl-acrylate, at a pressure greater than atmospheric and sufficient to suppress vaporization of monomer and in a vessel kept totally full of aqueous emulsion of polymer and monomer, the polymer to monomer ratio being from about 97:3 to about 99.5:0.5.

2. In the method of emulsion polymerization of claim 1, the process which comprises filling a closed reaction vessel with an emulsion of polymerizable monomer, subjecting the material in said vessel to polymerizing conditions and to gentle agitation until the polymer ratio is substantially from about 97:3 to about 99.5:0.5, then forcing into said vessel additional monomer emulsion while said polymerizing conditions prevail therein and said ratio is kept from about 97:3 to about 99.5:0.5, and thereby ejecting corresponding amounts of polymer emulsion, and keeping the pressure in said vessel above atmospheric sufficient to suppress vaporization of the monomer.

3. A method as defined in claim 2 in which the monomer emulsion is added to one end of the reaction vessel and the polymer emulsion is ejected from an end of said vessel opposite from said end to which the emulsion is added.

4. A continuous method of emulsion polymerization and co-polymerization, which comprises polymerization of monomers selected from the group consisting of butyl acrylate, ethyl acrylate, vinyl chloride, methyl methacrylate, and vinyl acetate, at a pressure greater than atmospheric and sufficient to suppress vaporization of monomer and in a vessel kept totally full of aqueous emulsion of polymer and monomer, the polymer to monomer ratio being from about 97:3 to about 99.5:0.5.

5. A continuous method of emulsion polymerization, which comprises polymerization of vinyl acetate at a pressure greater than amtospheric and sufficient to suppress vaporization of monomer and in a vessel kept totally full of aqueous emulsion of polymer and monomer, the polymer to monomer ratio being from about 97:3 to about 99.5:0.5.

6. A continuous method of emulsion co-polymerization which comprises polymerization of vinyl acetate, and 2-ethyl-hexyl-acrylate, at pressure greater than atmospheric and sufficient to suppress vaporization of monomer and in a vessel kept totally full of aqueous emulsion of polymer and monomer, the polymer to monomer ratio being from about 97:3 to 99.5:0.5.

References Cited by the Examiner

UNITED STATES PATENTS

| 2,614,087 | 10/1952 | Turnbull | 260—29.6 |
| 2,662,863 | 12/1953 | Bristol et al. | 260—29.6 |
| 2,777,832 | 1/1957 | Mollison | 260—29.6 |
| 2,998,400 | 8/1961 | French | 260—29.6 |

OTHER REFERENCES

Smith, "Vinyl Resins," Reinhold Pub. Co., New York, N.Y., 1958, p. 39.

Levenspiel: Chemical Reaction Engineering, John Wiley and Sons, publication 1962, New York, N.Y., pp. 99 and 163.

Bovey et al.: Emulsion Polymerization, Interscience Publishers, New York, N.Y., 1955, pp. 282–283.

MURRAY TILLMAN, *Primary Examiner.*

LEON J. BERCOVITZ, *Examiner.*

E. B. WOODRUFF, N. OBLON, *Assistant Examiners.*